No. 735,696.                                              Patented August 11, 1903.

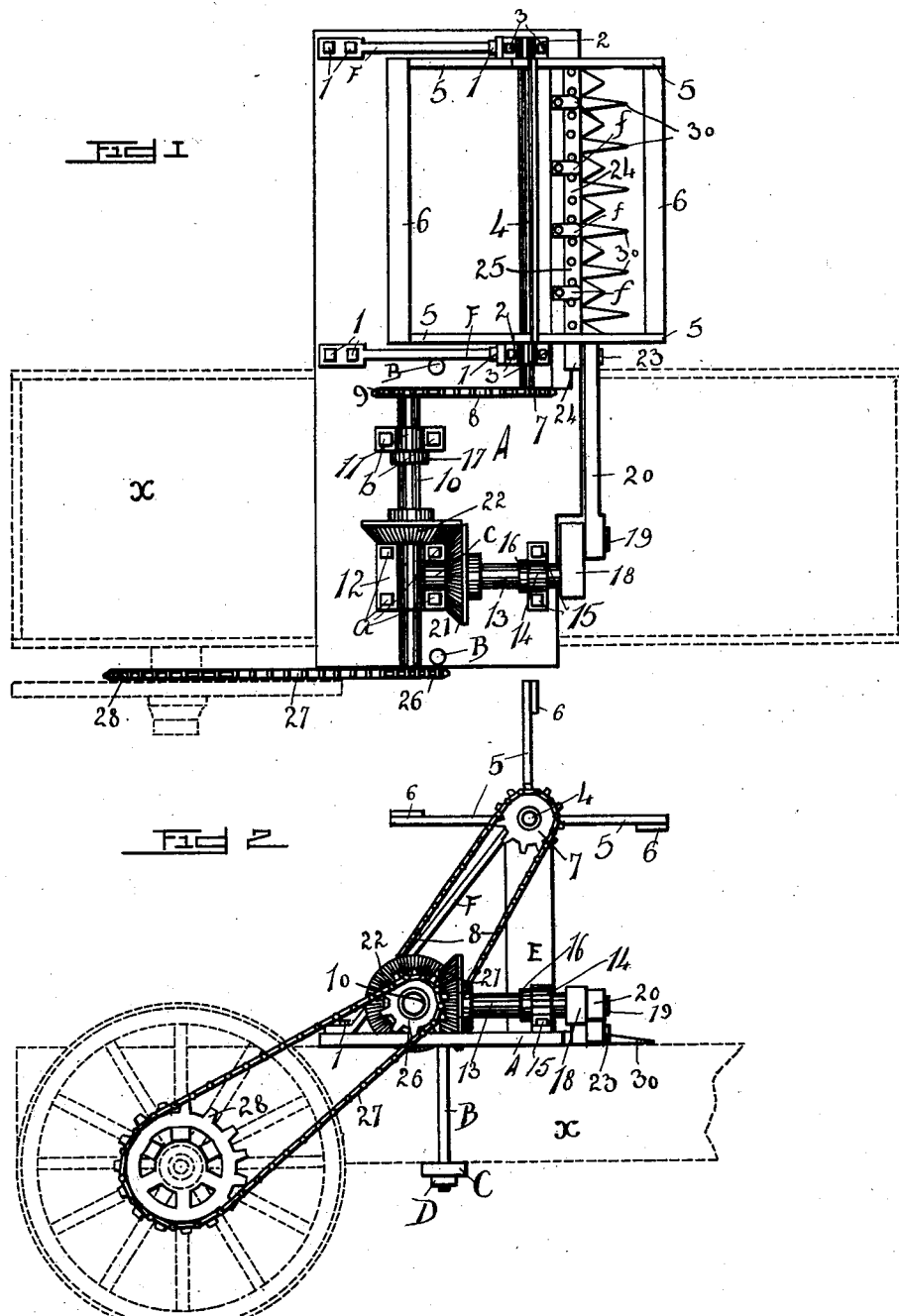

UNITED STATES PATENT OFFICE.

ISAAC O. BAXTER, OF AFTON, IOWA.

BROOM-CORN HARVESTER.

SPECIFICATION forming part of Letters Patent No. 735,696, dated August 11, 1903.

Application filed August 5, 1901. Serial No. 70,938. (No model.)

*To all whom it may concern:*

Be it known that I, ISAAC O. BAXTER, residing at Afton, in the county of Union and State of Iowa, have invented certain useful Improvements in Broom-Corn Harvesters; and I do hereby declare that the following is a full, clear, and exact description of the invention, such as will enable others skilled in the art to which it appertains to make and use the same, reference being had to the accompanying drawings, which form a part of this specification.

This invention relates to a new and novel broom-corn harvester.
The object of my invention is to provide a broom-corn harvester which may be detachably and adjustably secured to any ordinary farm-wagon and be carried through the field to cut the broom-corn a suitable distance below the brush thereof.

In the accompanying drawings I have shown in Figure 1 a top view of my broom-corn harvester, while Fig. 2 shows a side elevation of same, disclosing my harvester as secured to an ordinary farm-wagon, as shown in dotted lines.

My invention embodies a board or platform A, to which are secured the standards E, which are held by means of the brace-bars F. These bars F are secured by means of the bolts 11, as shown in Fig. 1. Secured to the top of these standards E are the bearings 2, secured thereto by means of the bolts 3, and mounted to revolve within these bearings 2 2 is an ordinary shaft 4, provided with arms 5, to which are secured the bars 6, to form a reel situated a suitable distance above platform A. To one end of this shaft 4 I secure an ordinary sprocket-chain wheel 7, over which passes a sprocket-chain 8, which chain in turn works over a sprocket 9, as is shown more clearly in Fig. 1.

It will be noticed that the platform A is of a length approximately twice the width of the wagon-body X, as shown in dotted lines, and that the reel is positioned upon the portion extending beyond the wagon-box.

The platform A is secured to any ordinary wagon-box, as X, by means of suitable bolts B, which pass through a clamping-bar C and are secured by means of the nuts D, so that this platform A may slide backward and forward upon the wagon-box and is removably secured thereto. At a suitable point I provide this platform A with a duplex bearing 12, secured by means of the bolts a, through which bearing passes and extends the shaft 10, which shaft is provided with the collar 17 and is further supported within the bearing 11, secured by means of the bolts b, as shown. At one end this shaft 10 is provided with a chain-sprocket 26, at the other end with the chain-sprocket 9, the latter engaged by the chain 8, as shown. A stub-bearing c is secured to the bearing 12, and within this stub-bearing c is held the stub-shaft 13, as shown. This stub-shaft 13 is further provided with a collar 16 and works within the bearing 14, held by means of the bolts 15.

Secured to the shaft 10 is a bevel-gear 22, while secured to the shaft 13 is a bevel-gear 21, these bevel-gears 21 and 22 meshing.

The shaft 10 is prevented from being laterally displaced by means of the collar 17 and bevel-gear 22, while the stub-shaft 13 is prevented from being laterally displaced by means of the collar 16 and bevel-gear 21.

Secured to the shaft 13 is a crank-arm 18, to which is secured a pin 19, from which extends a pitman 20, in turn secured to the pin 23, fastened to the end 24 of the cutter-bar 25, forming a portion of the sickle 30, as is usual in mowing-machines, the sickle being held by means of sickle-guards, as is usual in the art. As the pitman is actuated the sickle-bar is operated. This is accomplished in driving the main shaft 10 by means of a chain 27, passing over the sprocket 26, and this chain 27 passes over a sprocket 28, fastened to one of the vehicle-wheels, as is shown in the drawings.

In moving a vehicle provided with this harvester forward the shaft 10 is actuated so that the reel is revolved to depress and carry the stalks against the sickle-bar and throw them backward, where they are grasped and collected by operators standing within the vehicle.

The device is noticeable because of its simplicity.

Having thus described my invention, what I claim as new, and desire to secure by United States Letters Patent, is—

In a harvester of the class described, the combination with a platform, securing-bolts depending therefrom, and a clamping-bar engaged by said bolts to secure the harvester to a vehicle-body, the length of said platform being greater than the width of the vehicle-body, whereby one end of the platform is caused to project beyond the side of the vehicle-body, of a driving-shaft arranged longitudinally of said platform, bearing-boxes carried by said platform and in which said driving-shaft is journaled, one of said boxes also having a bearing extending at right angles to the bearing in which said driving-shaft is journaled, a stub-shaft journaled in said bearing and extending at right angles to the driving-shaft, beveled gears carried by the driving and stub shafts and engaging each other, a cutter carried by the end of the platform designed to project beyond the side of the vehicle-body, a pitman connected to said cutter and to said stub-shaft, whereby said cutter is operated by the stub-shaft, a reel mounted in a plane above said cutter, gearing between said reel and the driving-shaft, whereby the latter simultaneously actuates the cutter and said reel, and means for operating the driving-shaft from one of the vehicle-wheels.

ISAAC O. BAXTER.

Witnesses:
J. M. MILLIGAN,
F. A. SHUTE.